United States Patent
Rusu et al.

(10) Patent No.: US 11,809,433 B2
(45) Date of Patent: *Nov. 7, 2023

(54) COGNITIVE PROXIMATE CALCULATIONS FOR A RETURN ITEM

(71) Applicant: International Business Machines Corporation, Armonk, NY (US)

(72) Inventors: Laura Irina Rusu, Endeavour Hills (AU); Gandhi Sivakumar, Bentleigh (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 318 days.

This patent is subject to a terminal disclaimer.

(21) Appl. No.: 16/434,768

(22) Filed: Jun. 7, 2019

(65) Prior Publication Data

US 2019/0332604 A1    Oct. 31, 2019

Related U.S. Application Data

(63) Continuation of application No. 15/196,117, filed on Jun. 29, 2016, now Pat. No. 10,409,824.

(51) Int. Cl.
  *G06F 16/2457* (2019.01)
  *G06F 16/2455* (2019.01)
  *G06N 5/022* (2023.01)

(52) U.S. Cl.
  CPC .... *G06F 16/24578* (2019.01); *G06F 16/2455* (2019.01); *G06N 5/022* (2013.01)

(58) Field of Classification Search
  CPC ........... G06F 16/24578; G06F 16/2455; G06F 16/908; G06F 16/9035; G06F 16/9038; G06F 16/248; G06F 16/345; G06N 5/022
  See application file for complete search history.

(56) References Cited

U.S. PATENT DOCUMENTS 7,072,863 B1 *  7/2006  Phillips .................. G06Q 40/00
                                                                703/2
7,842,896 B1 * 11/2010  Calcoen .................. B07C 5/368
                                                                209/576

(Continued)

FOREIGN PATENT DOCUMENTS

CA    2805872 A1 *  2/2012  ......... G06F 16/9038
CA    2805964 A1 *  2/2012  ........... G06F 16/248

(Continued)

OTHER PUBLICATIONS

Dataquest, "SQL Operators: 6 Different Types (W/Examples)" (Year: 2021).*

(Continued)

*Primary Examiner* — Neveen Abel Jalil
*Assistant Examiner* — Hubert Cheung
(74) *Attorney, Agent, or Firm* — Anthony Mauricio Pallone; MCGINN I.P. LAW GROUP, PLLC.

(57) ABSTRACT

A cognitive proximate recommendation method, system, and non-transitory computer readable medium, include first extracting a requested feature and a requested value of the requested feature for a requested item and returning a return item from a plurality of return items stored in the database and returning a ranked list of the plurality of return items, where the ranked list further includes inter-relationships that are defined by defining a primary value of each of the requested items and the return feature corresponding to the requested feature or anchor value for each of the requested items and the return feature corresponding to the requested feature.

7 Claims, 6 Drawing Sheets

(56) References Cited

U.S. PATENT DOCUMENTS

| | | | |
|---|---|---|---|
| 7,974,885 B1* | 7/2011 | Bowman | G06Q 30/0601 |
| | | | 705/26.1 |
| 9,183,259 B1* | 11/2015 | Marra | G06Q 50/01 |
| 9,251,217 B2* | 2/2016 | Sinha | G06F 16/355 |
| 9,251,223 B2 | 2/2016 | Chin et al. | |
| 9,253,615 B2 | 2/2016 | Ickman et al. | |
| 9,305,099 B1* | 4/2016 | Dean | G06F 16/951 |
| 9,361,624 B2* | 6/2016 | Spears | G06Q 30/02 |
| 9,454,884 B1* | 9/2016 | Chen | G08B 13/19697 |
| 9,817,869 B2* | 11/2017 | Aradhye | H04L 51/24 |
| 9,886,424 B2* | 2/2018 | Tuteja | G06F 40/10 |
| 10,223,648 B2* | 3/2019 | Tseng | G06Q 30/0269 |
| 10,282,431 B1* | 5/2019 | Bhotika | G06F 16/5866 |
| 10,332,181 B1* | 6/2019 | McAllister | G06Q 30/0629 |
| 2006/0161520 A1 | 7/2006 | Brewer et al. | |
| 2006/0224587 A1* | 10/2006 | Zamir | G06F 16/24534 |
| 2007/0130137 A1* | 6/2007 | Oliver | G06F 16/24578 |
| | | | 707/999.005 |
| 2007/0219985 A1* | 9/2007 | Aravamudan | G06F 16/335 |
| 2007/0288456 A1* | 12/2007 | Aravamudan | G06F 16/248 |
| 2009/0171867 A1* | 7/2009 | Bilenko | G06F 16/316 |
| | | | 706/12 |
| 2009/0248634 A1 | 10/2009 | Allen | |
| 2011/0252031 A1* | 10/2011 | Blumenthal | G06F 16/951 |
| | | | 707/E17.014 |
| 2011/0258149 A1* | 10/2011 | Kanungo | G06F 16/9558 |
| | | | 706/12 |
| 2012/0183206 A1* | 7/2012 | Tan | G06K 9/6215 |
| | | | 382/159 |
| 2012/0221562 A1* | 8/2012 | Zhang | G06F 16/285 |
| | | | 707/728 |
| 2012/0246174 A1* | 9/2012 | Spears | G06Q 50/01 |
| | | | 707/E17.005 |
| 2012/0246718 A1* | 9/2012 | Spears | G06Q 30/02 |
| | | | 726/21 |
| 2012/0254163 A1 | 10/2012 | Bandyopadhyay et al. | |
| 2012/0278318 A1* | 11/2012 | Reznik | G06F 16/9535 |
| | | | 707/E17.084 |
| 2012/0308121 A1* | 12/2012 | Datta | G06K 9/6263 |
| | | | 382/155 |
| 2012/0330954 A1* | 12/2012 | Sivasubramanian | |
| | | | H04L 67/1097 |
| | | | 707/E17.089 |
| 2013/0173571 A1* | 7/2013 | Chen | G06F 16/00 |
| | | | 707/706 |
| 2013/0231768 A1* | 9/2013 | Jensen | G05B 19/18 |
| | | | 700/98 |
| 2013/0282684 A1 | 10/2013 | Stouffer et al. | |
| 2014/0019443 A1 | 1/2014 | Golshan | |
| 2014/0025532 A1* | 1/2014 | Huang | G06Q 30/0631 |
| | | | 705/26.7 |
| 2014/0046965 A1* | 2/2014 | Tian | G06F 16/9535 |
| | | | 707/749 |
| 2014/0149378 A1* | 5/2014 | Chandra | G06F 16/951 |
| | | | 707/706 |
| 2014/0156652 A1* | 6/2014 | Abiola | G06Q 10/1053 |
| | | | 707/723 |
| 2014/0188897 A1* | 7/2014 | Baker | G06F 16/24578 |
| | | | 707/748 |
| 2014/0280095 A1* | 9/2014 | Friedman | G06Q 30/0277 |
| | | | 707/723 |
| 2014/0280112 A1 | 9/2014 | Cheng et al. | |
| 2014/0330819 A1 | 11/2014 | Raina et al. | |
| 2014/0337000 A1* | 11/2014 | Asenjo | G06Q 10/06 |
| | | | 703/13 |
| 2014/0380286 A1 | 12/2014 | Gabel et al. | |
| 2015/0113004 A1 | 4/2015 | Despain | |
| 2015/0205796 A1* | 7/2015 | Araki | G06F 16/24578 |
| | | | 707/748 |
| 2015/0213119 A1 | 7/2015 | Agarwal et al. | |
| 2015/0254248 A1* | 9/2015 | Burns | G06F 16/24578 |
| | | | 707/749 |
| 2015/0310526 A1* | 10/2015 | Warren | G06F 16/248 |
| | | | 705/26.62 |
| 2016/0004752 A1 | 1/2016 | Zlamany et al. | |
| 2016/0042083 A1* | 2/2016 | Mawhinney | G06F 16/9577 |
| | | | 707/734 |
| 2016/0048772 A1 | 2/2016 | Bruno et al. | |
| 2016/0103888 A1 | 4/2016 | Fletcher et al. | |
| 2016/0117329 A1* | 4/2016 | Busey | G06F 16/287 |
| | | | 707/726 |
| 2016/0117623 A1* | 4/2016 | Hoover | G06F 16/25 |
| | | | 705/7.28 |
| 2016/0140240 A1 | 5/2016 | Allen et al. | |
| 2016/0170996 A1 | 6/2016 | Frank et al. | |
| 2016/0188587 A1* | 6/2016 | Martin | G06F 16/134 |
| | | | 707/734 |
| 2016/0224629 A1* | 8/2016 | Beacom | G06F 16/24554 |
| 2016/0224672 A1 | 8/2016 | Bindal et al. | |
| 2016/0224803 A1 | 8/2016 | Frank et al. | |
| 2016/0283564 A1* | 9/2016 | Sharon | G06F 16/24578 |
| 2016/0284007 A1* | 9/2016 | Sakai | G06Q 30/0631 |
| 2016/0328481 A1 | 11/2016 | Marra et al. | |
| 2016/0378757 A1* | 12/2016 | Bahl | G06Q 50/01 |
| | | | 707/728 |
| 2017/0031909 A1* | 2/2017 | Holler | G06F 16/2255 |
| 2017/0083573 A1* | 3/2017 | Rogers | G06F 16/2455 |
| 2017/0164011 A1* | 6/2017 | Rimon | H04N 21/232 |
| 2017/0228774 A1* | 8/2017 | Sallas | H04W 4/02 |
| 2017/0278062 A1* | 9/2017 | Mueller | G06Q 30/0631 |
| 2017/0285911 A1 | 10/2017 | White et al. | |
| 2017/0293622 A1* | 10/2017 | Miller | G06F 16/338 |
| 2017/0293860 A1* | 10/2017 | Fyffe | G06N 5/04 |
| 2017/0308535 A1* | 10/2017 | Agarwal | G06F 16/24578 |
| 2017/0329780 A1* | 11/2017 | Salowitz | H04W 4/021 |
| 2017/0351709 A1 | 12/2017 | Kong et al. | |
| 2020/0074407 A1* | 3/2020 | Balasia | G06Q 10/1053 |
| 2021/0224285 A1* | 7/2021 | Aravamudan | G06F 3/0482 |
| 2022/0182699 A1* | 6/2022 | Gordon | H04N 21/6175 |

FOREIGN PATENT DOCUMENTS

| | | | | |
|---|---|---|---|---|
| CN | 106326427 A | * | 1/2017 | G06F 16/2455 |
| CN | 106934033 A | * | 7/2017 | |
| CN | 112800093 A | * | 5/2021 | |
| GB | 2443438 A | * | 5/2008 | G06F 17/248 |
| TW | 201531164 A | * | 8/2015 | G01C 21/206 |
| WO | WO-2007088605 A1 | * | 8/2007 | G06F 11/1417 |
| WO | WO-2007103938 A2 | * | 9/2007 | G06F 16/2453 |
| WO | WO-2012142751 A1 | * | 10/2012 | G06F 17/30522 |

OTHER PUBLICATIONS

United States Notice of Allowance dated May 31, 2019, in U.S. Appl. No. 15/196,117.

United States Office Action dated Mar. 5, 2019, in U.S. Appl. No. 15/196,117.

United States Office Action dated Nov. 15, 2018, in U.S. Appl. No. 15/196,117.

Mel, et al. "The NIST Definition of Cloud Computing". Recommendations of the National Institute of Standards and Technology. Nov. 16, 2015.

* cited by examiner

COGNITIVE PROXIMATE RECOMMENDING METHOD 100

COGNITIVE PROXIMATE CALCULATIONS FOR A RETURN ITEM

CROSS-REFERENCE TO RELATED APPLICATIONS

The present application is a Continuation Application of U.S. patent application Ser. No. 15/196,117, filed on Jun. 29, 2016, the entire contents of which are hereby incorporated by reference.

BACKGROUND

The present invention relates generally to a cognitive proximate recommendation method, and more particularly, but not by way of limitation, to a system, method, and recording medium for recommending an item in response to a user query having a lowest proximal distance between values of extracted features of the items and the requested item by the user.

Industry is trending towards so called "cognitive models" enabled via "Big Data" platforms. Such cognitive models are aimed to remember prior interactions with users and continuously learn and refine the responses for future interactions. For example, cognitive agents are being used for welcoming customers at business door steps and are expected to evolve intelligent with generations. Such agents could be enriched for better customer handling by building the intelligence of the agents.

Conventional cognitive models for searching and returning answers have proposed searching for information within social networks. The conventional search assist techniques receive a query, such as a partial query, identifies two or more categories of data that include information satisfying the query, ranks the identified categories of data based on various selection criteria, and presents suggested search terms based on the rankings. However, the conventional techniques relate to a display of the results, not the selection in that the conventional techniques rank the results of the query on two or more identified categories and calculate a quality matrix that is used to display results. The conventional techniques do not intelligently learn to provide best alternatives when a null response may occur.

That is, there is a technical problem in that the conventional techniques do not consider a cognitive way of determining a best alternative when a match does not exist and do not consider using user preferences to weigh values of features of potential results to intelligently provide a better alternative.

SUMMARY

Thus, the inventors have realized a technical solution to the technical problem to provide significantly more than the conventional technique of question/answer interaction by configuring a cognitive analysis of requested items by extracting the requested features and values of the features by the user and intelligently providing a closest alternative based on extracting the same features of alternative items and comparing the values of the alternatives with user preferences to return the closest alternative. Thus, the technical solution improves upon the computer functionality itself by providing better results more efficiently.

In an exemplary embodiment, the present invention can provide a cognitive proximate recommendation method including a database, the method including identifying a requested item based on a user request, first extracting a requested feature and a requested value of the requested feature for the requested item, and returning a return item from a plurality of return items stored in the database by: second extracting a return feature corresponding to the requested feature for each of the plurality of return items, third extracting a return value of the return feature, and calculating a proximal distance between the return value for each of the plurality of return items and the requested value of the requested item.

Further, in another exemplary embodiment, the present invention can provide a non-transitory computer-readable recording medium recording a cognitive proximate recommendation program including a database, the program causing a computer to perform: identifying a requested item based on a user request, first extracting a requested feature and a requested value of the requested feature for the requested item, and returning a return item from a plurality of return items stored in the database by: second extracting a return feature corresponding to the requested feature for each of the plurality of return items, third extracting a return value of the return feature, and calculating a proximal distance between the return value for each of the plurality of return items and the requested value of the requested item.

Even further, in another exemplary embodiment, the present invention can provide a cognitive proximate recommendation system, said system including a database, a processor, and a memory, the memory storing instructions to cause the processor to: identifying a requested item based on a user request, first extracting a requested feature and a requested value of the requested feature for the requested item, and returning a return item from a plurality of return items stored in the database by: second extracting a return feature corresponding to the requested feature for each of the plurality of return items, third extracting a return value of the return feature, and calculating a proximal distance between the return value for each of the plurality of return items and the requested value of the requested item.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
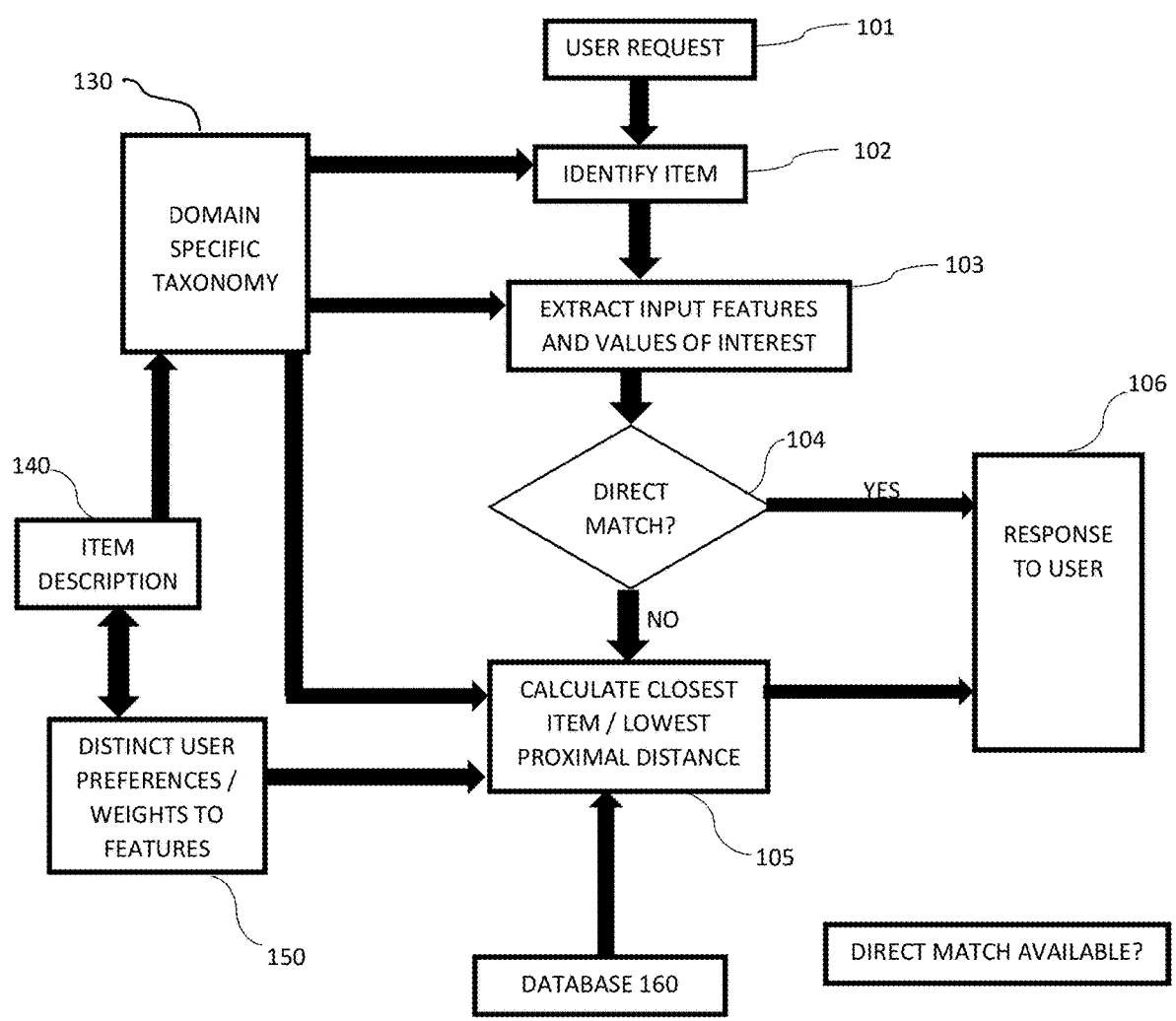
FIG. 1 exemplarily shows a high level flow chart for a cognitive proximate recommendation method 100.

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the cognitive proximate recommendation method 100 includes various steps to provide a user with a closest item having a lowest (smallest) proximal distance from the user request. Moreover, the method (system) can benefit from "learning" from past preferences of the user. As shown in at least FIG. 4, one or more computers of a computer system 12 can include a memory 28 having instructions stored in a storage system to perform the steps of FIG. 1.

With the use of these various steps and instructions, the cognitive proximate recommendation method 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Figure 4:
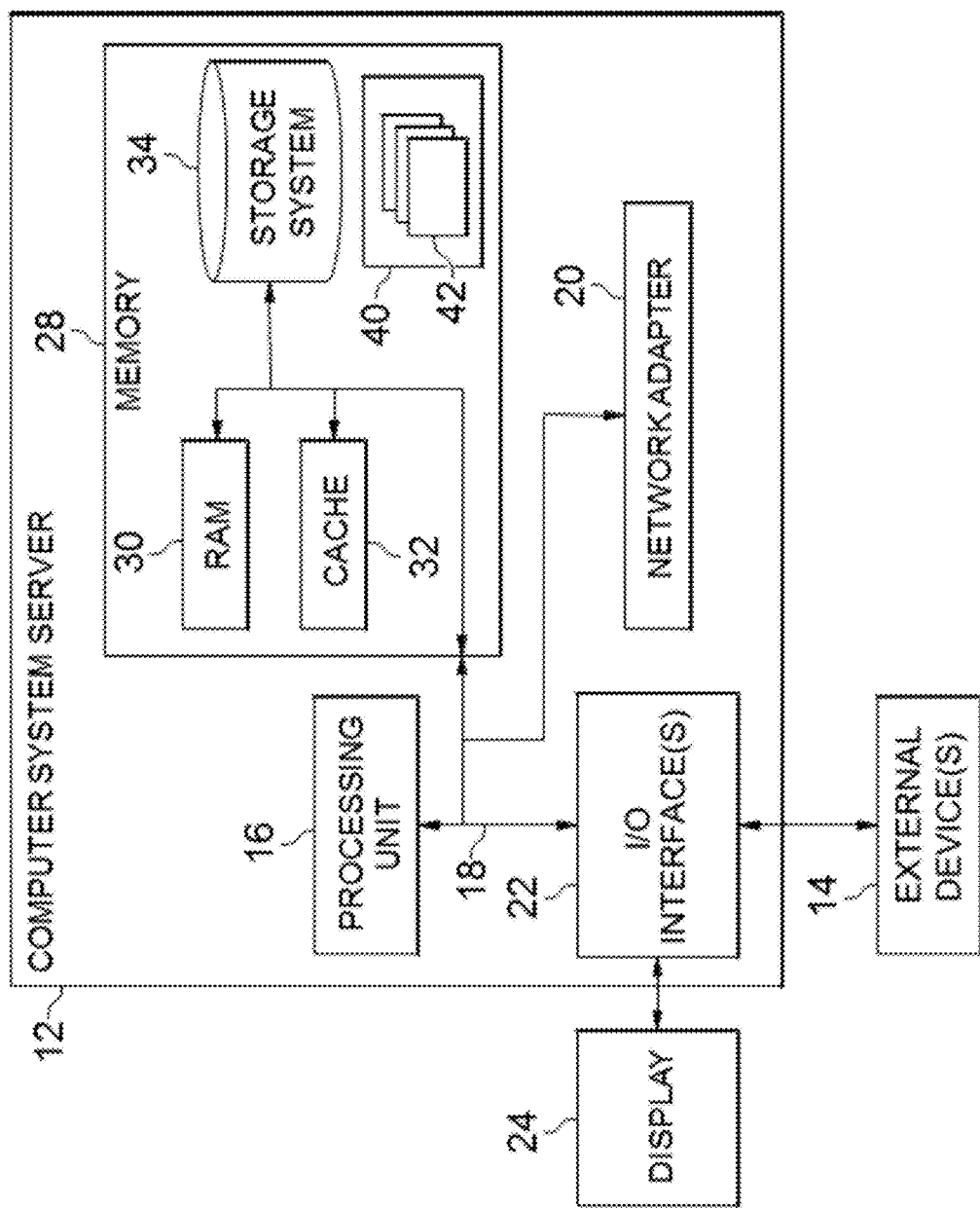
FIG. 4 depicts a cloud computing node according to an embodiment of the present invention.
Figure 5:
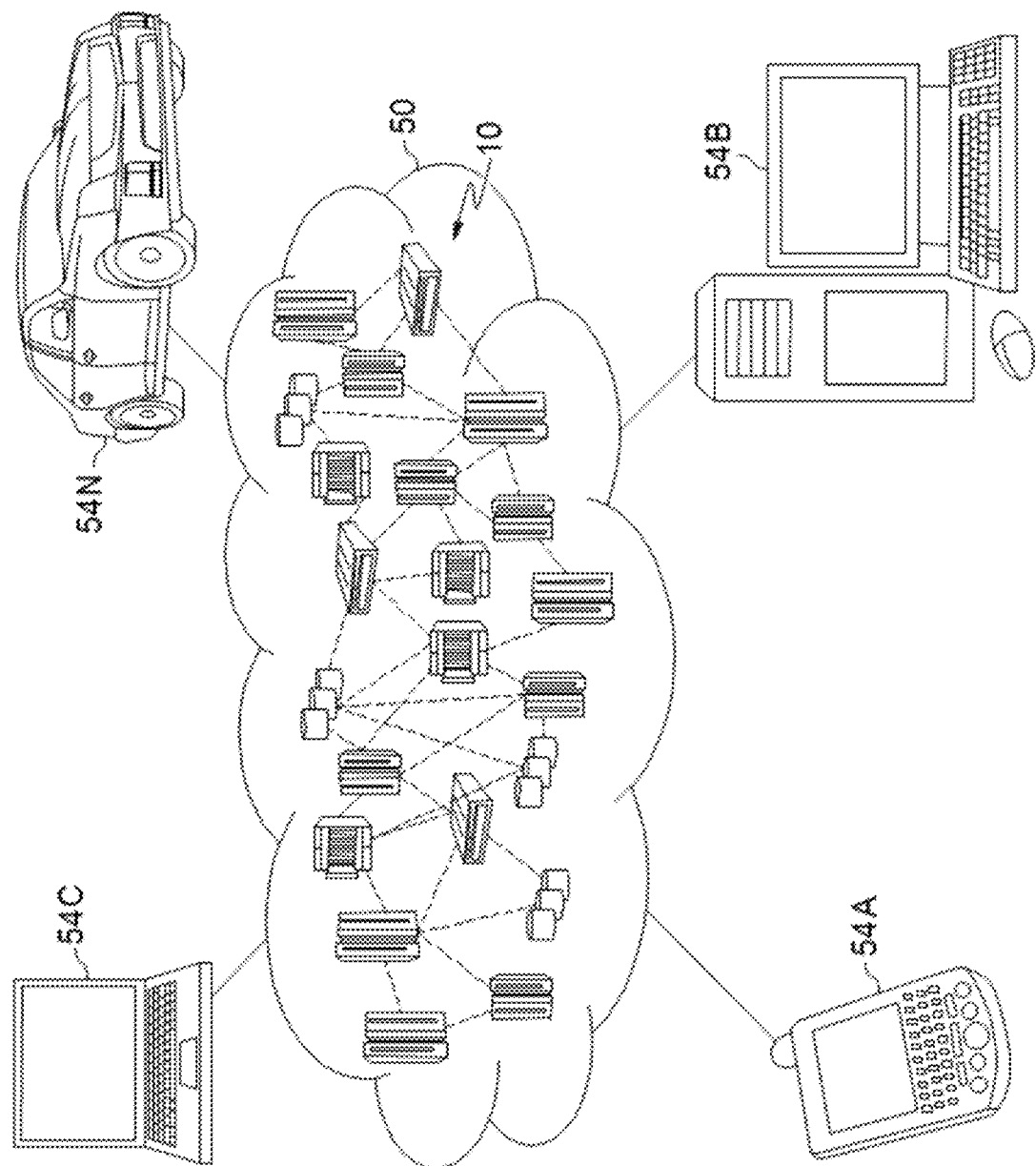
FIG. 5 depicts a cloud computing environment according to another embodiment of the present invention.
Figure 6:
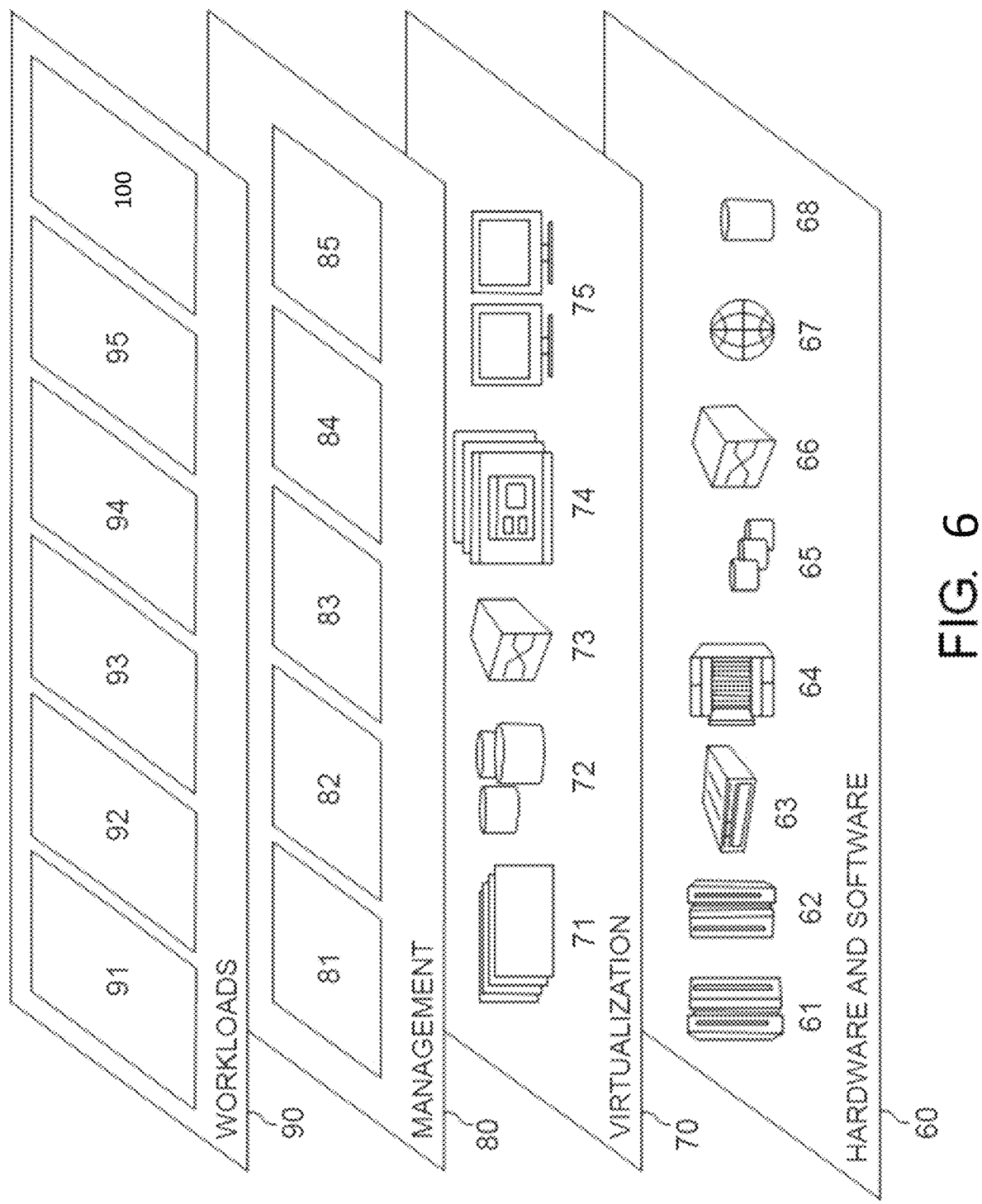
FIG. 6 depicts abstraction model layers according to an embodiment of the present invention.

Although as shown in FIGS. 4-6 and as described later, the computer system/server 12 is exemplarily shown in cloud computing node 10 as a general-purpose computing circuit which may execute in a layer the cognitive proximate recommendation system method (FIG. 5), it is noted that the present invention can be implemented outside of the cloud environment.

Step 101 receives a user request of a question, query, input, search or the like that the user would like a return. Step 101 can receive the user input by, for example, a Graphical User Interface (GUI)-based interface enabling the CRUD (Create, Read, Update, Delete) processes and extension of an industry specific proximate framework. The user request 101 includes a description of the item (e.g., item description 140).

Based on the user request of Step 101, Step 102 identifies the requested item based on the domain-specific taxonomy database 130 and item description 140.

The domain specific taxonomy 130 includes information on lexical relations between words or ontological relations between concepts such that the item description 140 can be used to identify the item requested in Step 102 and identify features and values of the requested item and potential return items in Steps 103 and 104 as described later. The domain-specific taxonomy 130 can be cognitive in that the domain-specific taxonomy 130 can learn new lexical relations between words based on the user choosing a response not ranked the highest.

For example, if the user request of Step 101 is "I want a red car with a 2.0-cylinder engine under 20,000 dollars" (e.g., the item description), Step 102 identifies that the "item" is "a car" that the user is requesting.

After the item is identified by Step 102, Step 103 extracts the features (attributes) of the requested item and the values of the features input by the user. For example, Step 103 can extract from the user input of "I want a red car with a 2.0-cylinder engine under 20,000 dollars" the feature of "color" having a value of "red", the feature of "cost" having a value of "under 20,000 dollars", and the feature of "engine size" having a value of "2.0-cylinder".

That is, each feature comprises one or more values. Moreover, each feature (or value of a feature) can be dependent or independent of other features (or values of the same feature, respectively). For example, a feature of "taste" in food would be dependent on the feature of "ingredients" and the values thereof. Alternatively, the engine size ("feature") of a car and the color ("feature") of the car can be independent from each other but the price ("feature") of the car can be dependent on both the engine size and the color. Thus, Step 103 can define inter-relationships of the feature values or define a primary or anchor value for the linked features (e.g., for "taste" having a value of "sour", a primary anchor value can be "Tamarind").

Accordingly, Step 103 has the ability to define a proximal model of items depending upon the features and cognitive entity phrasing maps for each attribute.

Step 104 determines if there is a direct (e.g., exact) match of an item to the user based on the values of the features extracted by Step 103. That is, Step 104 would attempt to find a car ("item") having a color, engine size and cost ("features") of red, 2.0-cylinder, under 20,000 dollars ("values"), respectively.

If "YES", Step 106 returns the direct matched item to the user.

Figure 2:
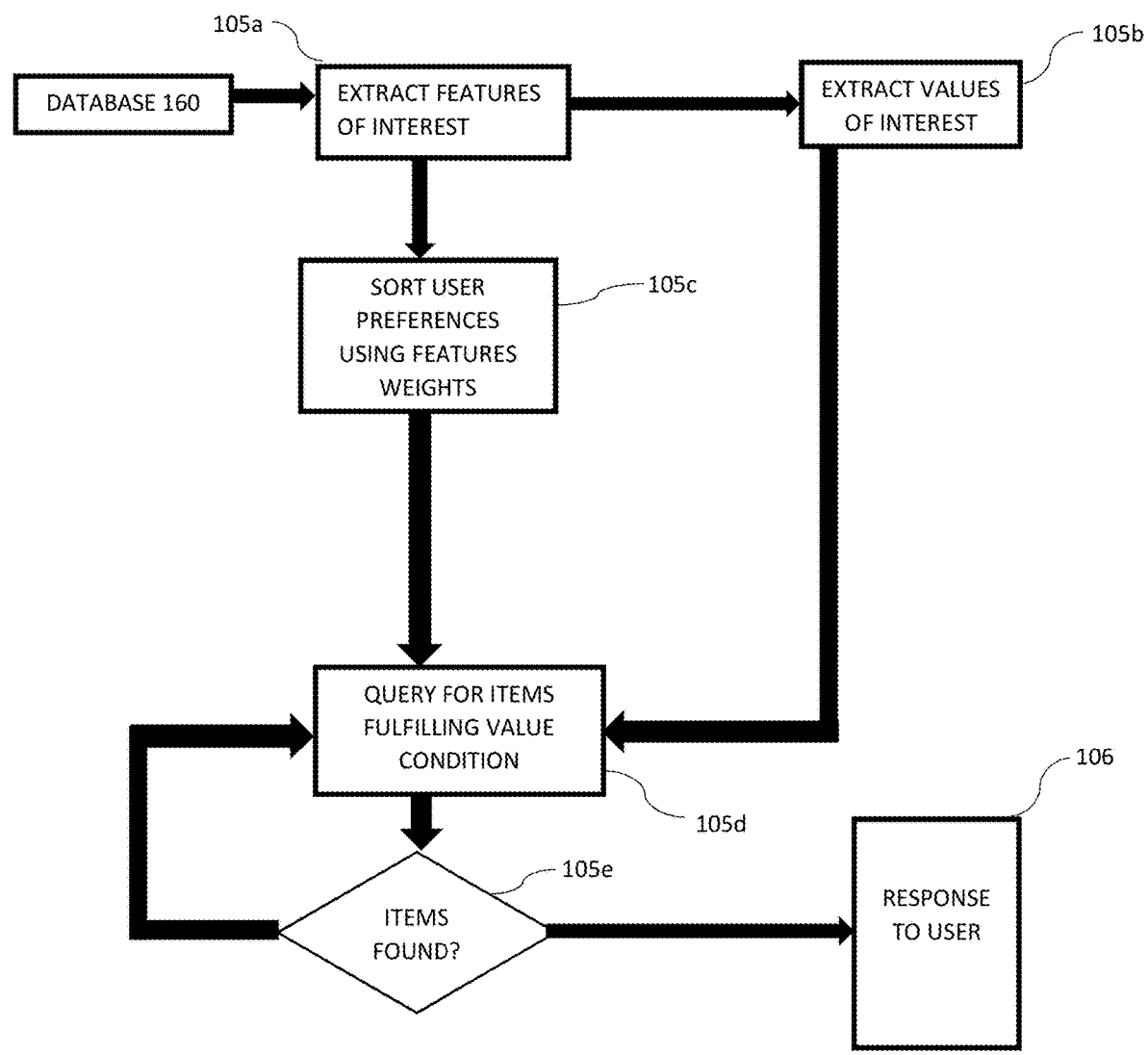
FIG. 2 exemplarily shows a high level flow chart for at least Step 105 of the cognitive proximate recommendation method 100.

If "NO", Step 105 calculates a closest item to the requested item by the user having a lowest (e.g., smallest) proximal distance from the requested item (the details by Step 105 are shown in FIG. 2). That is, Step 105a extracts the features of interest identified in Step 103 from each potential return item from a database 160 and Step 105b extracts the values of interest corresponding to the extracted features of interest. In other words, Step 105a extracts color, engine size, and cost of all potential cars that can be a return item and Step 105b extracts the values of each of the extracted features. The database 160 includes potential return items.

It is noted that Step 105a does not extract features not extracted by Step 103. That is, a car, for example, can be described by a plethora of features but Step 105a extracts the features of interest (i.e., in this present example, features of interest would be color, engine size, and cost) corresponding to the user request to provide the closest item. Thus, features not of interest (e.g., type of seats, type of transmission, type of tires, etc.) and values thereof are not extracted by Step 105a/105b.

Step 105c optionally sorts the features based on a distinct user preference or input weights to the features 150. That is, the user ranks (preferences) the features according to importance of the returned item matching the value of that feature. The distinct user preference or input weights to the features 150 can include a pre-configured preference of the user for the features, an additional query to the user from the GUI for the user to weight each identified feature by Step 103, a learned preference based on past user selections of the returned item (e.g., user always picks a car returned that matches cost instead of color), etc. For example, the user can assign that the feature of color is three times as important as cost and twice as important as engine size. It is noted that Step 105c is optional and absent an affirmative weight, by default, Step 105 ranks each feature equally.

Step 105d queries for items fulfilling the value condition of the features and ranks the returned items based on the lowest proximal distance between the potential return item and the requested item.

Step 105e continuously causes Step 105d to loop to return potential items to the user as the user response 106. Also, if no potential return items are found within a threshold proximal distance, Step 105e causes Step 105d to find potential return items based on a similarity of values of the potential return items to the request item. For example, if the extracted feature is color with a value of "red" for a car (item) and no red cars are in the database 160, Step 105d can return items to the user having a somewhat similar color such as "metallic red" (e.g., Step 105d can use a color scale to calculate similarity between red and a value of a potential return result). Thus, if the metallic red car is under 20,000 dollars and has a 2.0-cylinder engine, Step 105d can return the metallic red car to the user over a car that is, for example, green based on the preferences of the user. That is, Step 105e dynamically varies (overrides) the proximal distance driven by priority factors such that, for example, if a preferred flavor was "sour" and no primary ingredient to give the taste of sour was in stock (e.g., available), then Step 105e can traverse to the next closest ingredient and anchor it (e.g., from tamarind to lemon). Also, since 105e is a feedback loop, the user preferences (e.g., weights) are re-examined by Step 105d such that if the closest alternative was unavailable as in the above example and "lemon" was suggested, if the user was allergic to lemon, Step 105e would again cause the next closest alternative to be suggested such as "lime juice".

Thereby, Step 106 gives a ranked list of return items to the user ranked according to the proximal distance from the requested item.

Figure 3:
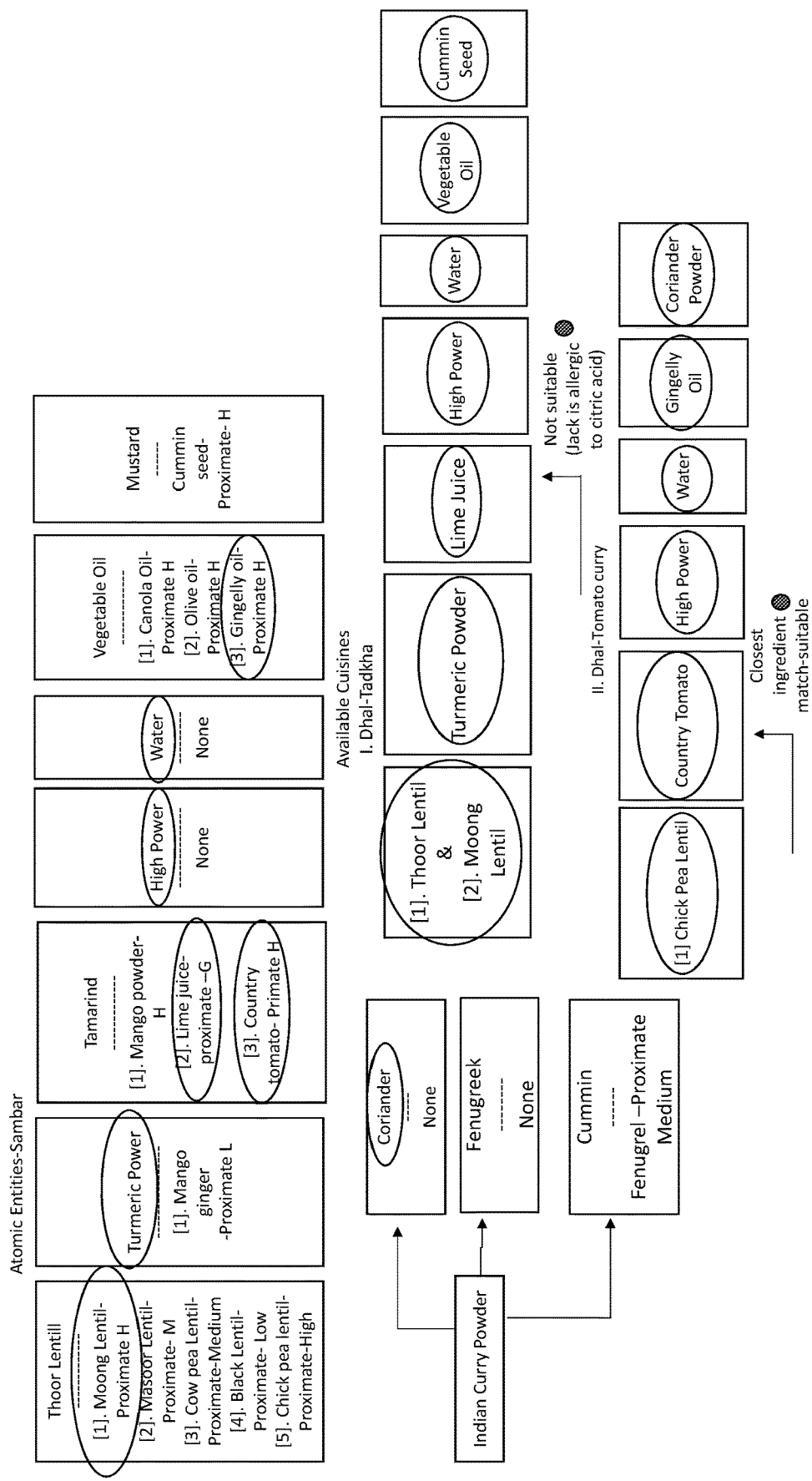
FIG. 3 exemplarily shows one embodiment of method 100.

In an exemplary use case of the method 100 as shown in FIG. 3, the method 100 can recommend alternative meals for a user based on user preference at a restaurant that does not have the requested meal.

For example, if a user normally orders "Sambar" (e.g., identified by Step 102), the method 100 via Step 103 breaks down the ingredients as features and determines the values of the ingredients for "Sambar". As shown in FIG. 3, Sambar is broken to its atomic and composite ingredients and identifies its Anchor entity as Dhal. It is noted that some items, e.g. Hing Powder and Water are atomic and could not be broken down further.

When Step 104 determines that no match exists, Step 105 searches for other available dishes and Step 105a/105b breaks down their ingredients and performs mapping of values to ingredients. In this example, Step 105d picks up Dhal Tadkha and Dhal Tomato curry, as closest dishes based on their Dhal content and the similarity of other ingredients. As shown in FIG. 3, proximates are flagged as H (high), M (medium) or L (low) based on their ability to map, e.g. H when the exact ingredient was found in another dish, L when it was not found, and M when a similar ingredient (e.g., from the same family) was found. However, a finer measure of similarity could be calculated, e.g., as percentage based on ontology tree.

Based on user preferences factored in Step 105c, Step 105d eliminates Dhal Tadkha because the user (i.e., Sack) is allergic to Citric juice, and therefore suggests Dhal Tomato curry as the best proximate to replace the initial Sambar order. The allergy to citric juice could be know either directly from the user (e.g. as a note/input at the time of order), or from the history of the user's orders, if he was a regular customer; the method 100 could have learned that some ingredients are systematically avoided by the user and therefore would exclude them from the suggestions.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 4, computer system/server 12 in cloud computing node 10 is shown in the form of a general-purpose computing circuit. The components of computer system server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtual nation layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the anti-counterfeiting system 100 and the anti-counterfeiting system 600 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A cognitive proximate recommendation method including a database, the cognitive proximate recommendation method comprising:
   first extracting a requested feature and a requested value of the requested feature for a requested item;
   defining a proximal model of items depending upon the requested feature and cognitive entity phrasing maps for each attribute of the requested item according to the requested feature resulting in a null response; and
   returning a return item from a plurality of return items stored in the database and returning a ranked list of the plurality of return items to replace the requested item based on the proximal model providing a closest item having a smallest proximal distance from the requested feature that resulted in the null response;
   sorting the plurality of return items based on a learned weight from a user selection of the return item from the ranked list for each of the first extracted plurality of requested features; and
   removing return items from the ranked list based on a filtering constraint associated with a user condition,
   wherein the ranked list further includes inter-relationships that are defined by defining a primary value of each of the requested items and the return feature corresponding to the requested feature for each of the requested items and the return feature corresponding to the requested feature,
   further comprising:

based on another null response to the return item of the plurality of return items, continuously querying the database until a non-null response is received to repeatedly execute the return of another return item from the ranked list of the plurality of return items having a proximal distance from the requested feature within a threshold value; and based on the return of the another return item, updating the learned weight from the user selection of the return item from the ranked list.

2. The cognitive proximate recommendation method of claim 1, wherein the first extracting extracts a plurality of requested features and a requested value for each of the plurality of requested features, and further comprising second extracting that further extracts a plurality of return features for each return item corresponding to the requested feature of the requested item.

3. The cognitive proximate recommendation method of claim 1, wherein the requested item is replaced with a highest ranked return item from the ranked list.

4. The cognitive proximate recommendation method of claim 1, wherein the user condition is extracted from an input linked to the requested item.

5. The cognitive proximate recommendation method of claim 1, wherein the closest item having the smallest proximal distance from the requested feature that resulted in the null response is an alternative to the requested feature that resulted in the null response.

6. A non-transitory computer-readable recording medium recording a cognitive proximate recommendation program including a database, the cognitive proximate recommendation program causing a computer to perform:

first extracting a requested feature and a requested value of the requested feature for a requested item;

defining a proximal model of items depending upon the requested feature and cognitive entity phrasing maps for each attribute of the requested item according to the requested feature resulting in a null response; and returning a return item from a plurality of return items stored in the database and returning a ranked list of the plurality of return items to replace the requested item based on the proximal model providing a closest item having a smallest proximal distance from the requested feature that resulted in the null response;

sorting the plurality of return items based on a learned weight from a user selection of the return item from the ranked list for each of the first extracted plurality of requested features; and removing return items from the ranked list based on a filtering constraint associated with a user condition, wherein the ranked list further includes inter-relationships that are defined by defining a primary value of each of the requested items and the return feature corresponding to the requested feature for each of the requested items and the return feature corresponding to the requested feature, further comprising:

based on another null response to the return item of the plurality of return items, continuously querying the database until a non-null response is received to repeatedly execute the return of another return item from the ranked list of the plurality of return items having a proximal distance from the requested feature within a threshold value; and based on the return of the another return item, updating the learned weight from the user selection of the return item from the ranked list.

7. A cognitive proximate recommendation system, the cognitive proximate recommendation system comprising:

a database;

a processor; and a memory, the memory storing instructions to cause the processor to:

first extracting a requested feature and a requested value of the requested feature for a requested item;

defining a proximal model of items depending upon the requested feature and cognitive entity phrasing maps for each attribute of the requested item according to the requested feature resulting in a null response; and returning a return item from a plurality of return items stored in the database and returning a ranked list of the plurality of return items to replace the requested item based on the proximal model providing a closest item having a smallest proximal distance from the requested feature that resulted in the null response;

sorting the plurality of return items based on a learned weight from a user selection of the return item from the ranked list for each of the first extracted plurality of requested features; and removing return items from the ranked list based on a filtering constraint associated with a user condition, wherein the ranked list further includes inter-relationships that are defined by defining a primary value of each of the requested items and the return feature corresponding to the requested feature for each of the requested items and the return feature corresponding to the requested feature, further comprising:

based on another null response to the return item of the plurality of return items, continuously querying the database until a non-null response is received to repeatedly execute the return of another return item from the ranked list of the plurality of return items having a proximal distance from the requested feature within a threshold value; and based on the return of the another return item, updating the learned weight from the user selection of the return item from the ranked list.

* * * * *